United States Patent Office 3,412,745
Patented Nov. 26, 1968

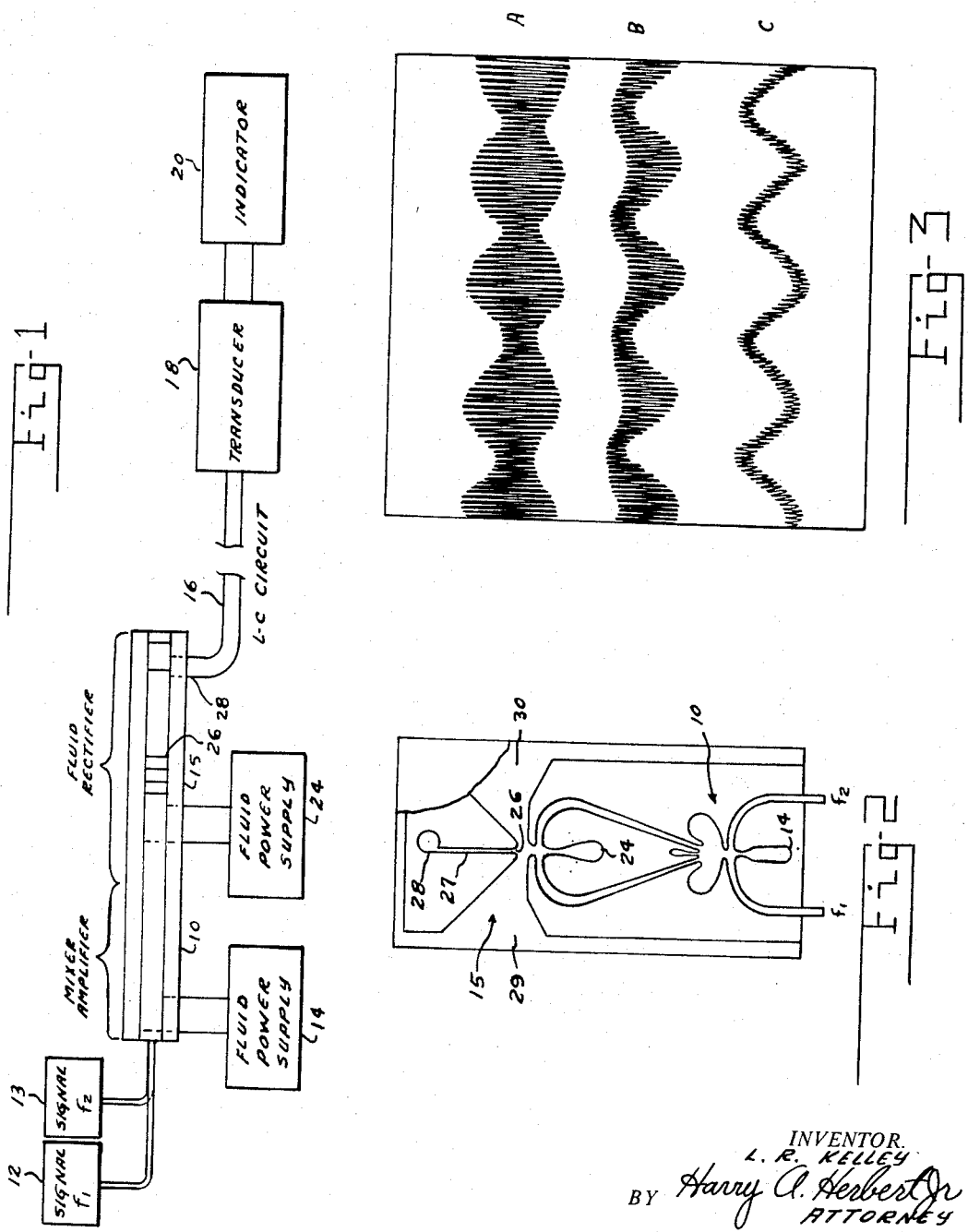

1

3,412,745
FLUID SUPERHETERODYNE DETECTOR
CIRCUIT
Lonny R. Kelley, Ballston Lake, N.Y., assignor to the
United States of America as represented by the Secretary of the Air Force
Filed June 23, 1966, Ser. No. 560,928
1 Claim. (Cl. 137—81.5)

ABSTRACT OF THE DISCLOSURE

A fluid detector device in which a fluid proportional mixer amplifier that drives a rectifier and L-C filter is used to provide a usable low frequency signal from the signals of two high frequency sensing elements.

---

This invention relates to a fluid superheterodyne detector circuit.

One object of the invention is to provide a device which will produce a usable low frequency signal from high frequency sensing elements used in fluidic systems.

This and other objects will be more fully understood from the following detailed description taken with the drawing wherein:

FIG. 1 is a schematic diagram partially in block form of the fluid superheterodyne detector according to the invention;

FIG. 2 is a top, partially cutaway, plan view of the mixer amplifier and rectifier for the device of FIG. 1; and FIG. 3 shows the wave forms for the fluid signal at various parts of the fluid circuit of FIG. 1.

Certain parameters, such as, pressure, temperature, displacement and velocity can be sensed with fluid sensors that have a frequency output which is a function of the sensed parameter. For such elements to be useful, some means is required to provide a usable low frequency fluid signal, such as by the use of two high frequency signals or between a sensed signal and a reference signal.

This invention provides a system to accomplish the subtraction of two fluid signals to provide a usable difference frequency signal. This is accomplished by means of a mixer fluid amplifier driving a rectifier and L-C filter.

Referring now to FIG. 1 of the drawing, the reference number 10 indicates a mixer amplifier having two input signals $f_1$ and $f_2$ from signal sources 12 and 13. These input signals could be two sensed signals or one sensed signal and a reference signal. The fluid mixer amplifier is a standard proportional fluid amplifier having two inputs as shown in FIG. 2.

The output of the mixer amplifier 10, such as shown in wave form A in FIG. 3 is fed to rectifier 15. The output of the mixer amplifier controls the flow of fluid from power source 24 into a rectifier orifice 26 through channel 27 to output 28. The channels 29 and 30 are open to the atmosphere. The output signal of the rectifier 15 is shown in wave form B. This signal is then applied to the L-C filter 16 which in the device tested was a 5 ft. length of 5/16" tubing. However, the particular length and diameter of the tubing used would be determined by the particular application. The output of the L-C filter, shown in wave form C, may be used as a fluid control signal or may be converted to an electrical signal with a piezoelectric transducer 18, such as, a Kistler transducer, with the output of the transducer being applied to an indicator 20.

There is thus provided a device which will produce a usable low frequency signal from high frequency sensing elements used in pure fluid systems.

While one specific embodiment has been described, it is obvious that numerous changes may be made without departing from the general principle and scope of the invention.

I claim:
1. A fluid operated superheterodyne detector comprising:
 a first stage proportional mixer amplifier having a fluid power stream inlet, opposed control stream inlets and a pair of outlet channels;
 means for applying a first high frequency signal to one of said control stream inlets;
 means for applying a second high frequency signal to an opposed control stream inlet;
 a second stage rectifier element having a single rectifier orifice, rectifier inlet means for directing a fluid power stream toward said rectifier orifice, opposed rectifier control inlets for controlling the flow of fluid into said rectifier orifice and vent means positioned between said rectifier control inlets and said rectifier orifice;
 means for applying the fluid flow through one of said outlet channels to one of said rectifier control inlets;
 means for applying the fluid flow through the other of said outlet channels to an opposed rectifier control inlet;
 a third stage fluid L-C filter consisting of a predetermined length of tubing having a predetermined diameter;
 means for applying the fluid flow through said rectifier orifice to said fluid L-C filter and signal utilization means connected to the output of said fluid L-C filter.

References Cited

UNITED STATES PATENTS

| | | | |
|---|---|---|---|
| 3,240,220 | 3/1966 | Jones | 137—81.5 |
| 3,273,377 | 9/1966 | Testerman et al. | 137—81.5 |
| 3,285,264 | 11/1966 | Boothe | 137—81.5 |
| 3,292,648 | 12/1966 | Colston | 137—81.5 |

M. CARY NELSON, *Primary Examiner.*
W. R. CLINE, *Assistant Examiner.*